United States Patent [19]

Younger

[11] 4,269,664
[45] May 26, 1981

[54] LIQUID TREATING AND DISTILLATION APPARATUS

[76] Inventor: Philip G. Younger, 919 19th St., SE., St. Cloud, Minn. 56301

[21] Appl. No.: 965,593

[22] Filed: Dec. 1, 1978

[51] Int. Cl.$^3$ .......................... C02F 1/06; B01D 3/10
[52] U.S. Cl. .................. 202/185 A; 202/197; 202/205; 202/234; 203/11; 203/91; 203/DIG. 1; 203/DIG. 14; 203/DIG. 20
[58] Field of Search ................... 202/185 A, 205, 185, 202/185 R, 197, 234; 203/4, 10, 11, 91, DIG. 14, DIG. 17, 19, DIG. 20, DIG. 1

[56] References Cited

U.S. PATENT DOCUMENTS

| | | | |
|---|---|---|---|
| 1,547,893 | 7/1925 | Bergius | 202/185 A |
| 1,966,938 | 7/1934 | Stone | 203/10 X |
| 2,006,985 | 7/1935 | Claude et al. | 203/10 X |
| 3,206,379 | 9/1965 | Hill | 202/185 |
| 3,206,380 | 9/1965 | Daviau | 202/185 |
| 3,390,057 | 6/1968 | Day | 202/185 |
| 3,528,890 | 9/1970 | Brown | 202/185 A |
| 3,674,652 | 7/1972 | Brown | 203/11 |

Primary Examiner—Wilbur L. Bascomb, Jr.
Attorney, Agent, or Firm—Merchant, Gould, Smith, Edell, Welter & Schmidt

[57] ABSTRACT

Liquid treating apparatus especially useful for water purification, including an output section and an input section interconnected at their tops by a closed condensation chamber. The input section includes raw liquid supply and return columns, opening at their bottoms into a raw liquid supply open to the atmosphere, and the output section includes treated liquid supply and return columns open at their bottoms into a treated liquid container also open to the atmosphere.

Treated liquid is cooled and circulated in the output section to produce and maintain negative pressure at one end of the condensation chamber, and raw water in mixed liquid and vapor form is supplied by aspiration in the input section, the vapor phase passing through the condensation chamber, and the liquid phase being used to drive the pump which causes the circulation in the output section. Several embodiments of the invention are shown.

8 Claims, 11 Drawing Figures

U.S. Patent   May 26, 1981   Sheet 2 of 3   4,269,664
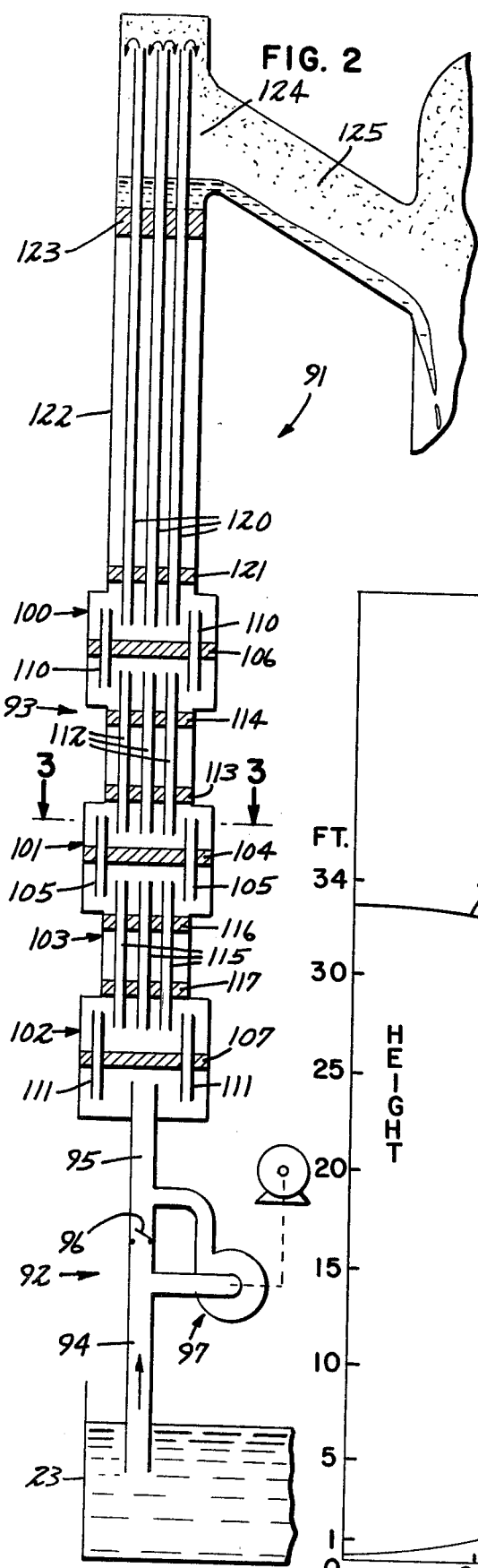
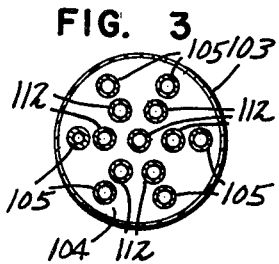
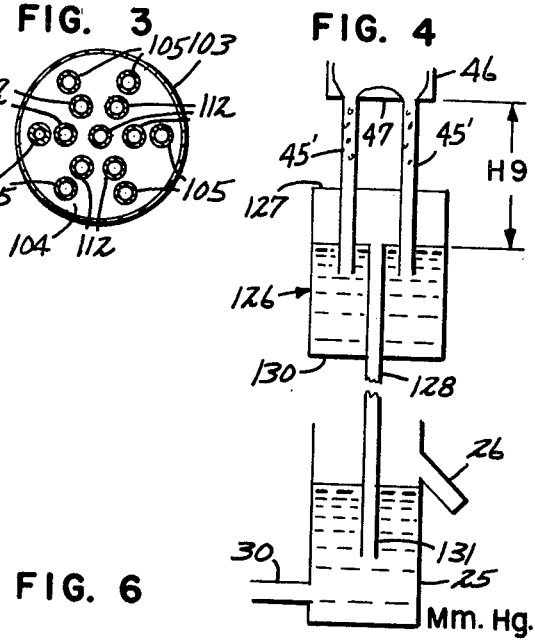
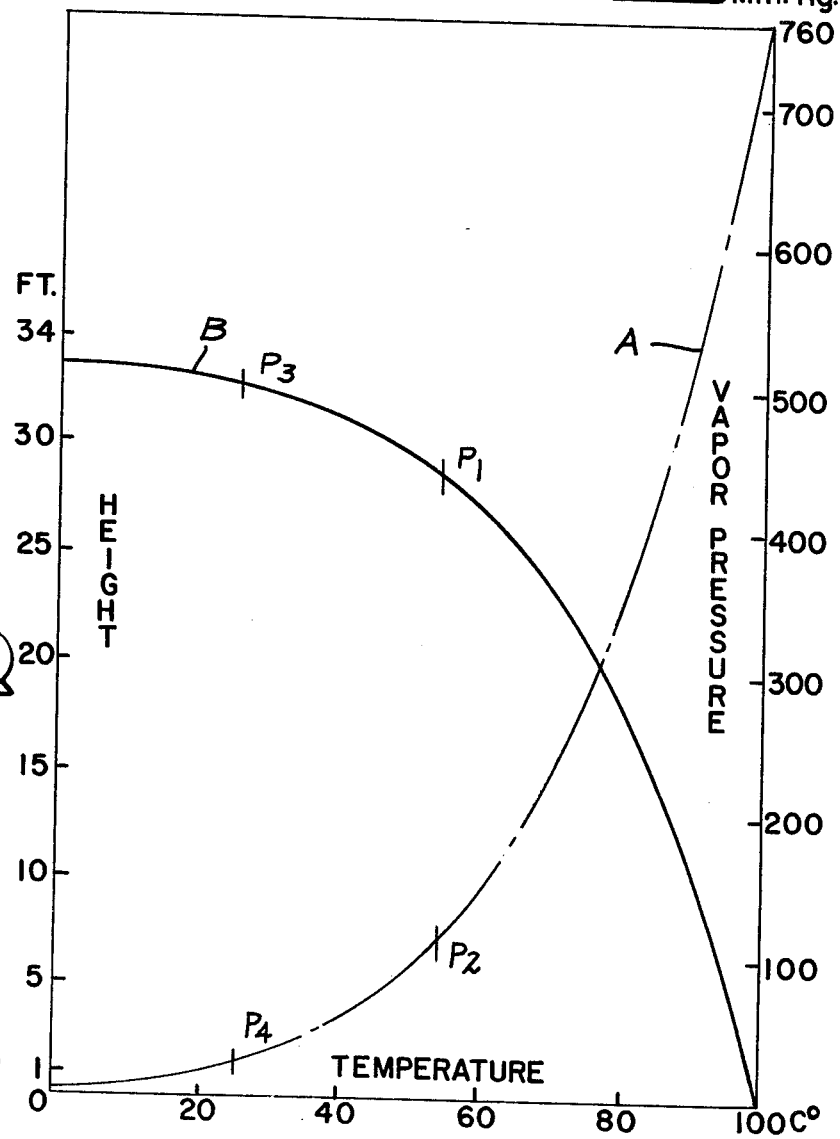

LIQUID TREATING AND DISTILLATION APPARATUS

BACKGROUND OF THE INVENTION

This invention relates to the field of chemical engineering, and particularly to apparatus for deriving potable water from a source which because of non-volatile pollutants is saline or otherwise not potable, although the invention is usable in other chemical applications as well.

There are many undeveloped areas of the world where potable water is scarce and expensive, although brackish water is plentiful and accessible at different temperatures, and where the supplies of electrical or mechanical energy common to more developed areas are simply not available.

The ocean is available as a source of relatively cool water, being maintained at a temperature about 25° C. even in the tropics. It is also well known that water at temperatures of 55° C. and even higher can readily be obtained from sources known as "solar ponds": such a pond may comprise an enclosed body of water, located to receive radiant energy from the sun, and covered with material which is transparent to solar energy but is impervious to water vapor, to prevent the loss of heat which accompanies evaporation.

My apparatus operates to provide a continual source of potable water under these conditions, being maintained in operation solely by the stored energy represented by the difference in temperature between the two sources of water.

SUMMARY OF THE INVENTION

A system embodying my invention comprises treated water output means and raw water input means, interconnected by a condensation chamber. The output means comprises a generally vertical treated water supply column and a generally vertical treated water return column, interconnected at their tops for liquid flow, and the inlet means comprises a generally vertical raw water supply column and a generally vertical raw water return column, also interconnected at their tops for liquid flow. The condensation chamber extends between and above the input and output means, to provide a path for water in vapor form only from the former to the latter without enabling liquid movement therebetween. The input means draws raw water from a source such as a solar pond and returns it to the source at a lower temperature and a higher pollution concentration. The output means recirculates treated water from a source through a heat exchanger which maintains its temperature at a lower level than that of the raw water. Externally energized pumps are provided for initiating operation of the system, but may be de-activated as unnecessary when the system operation has been established.

A plurality of embodiments of the invention are shown.

Various advantages and features of novelty which characterize my invention are pointed out with particularity in the claims annexed hereto and forming a part hereof. However, for a better understanding of the invention, its advantages, and objects attained by its use, reference should be had to the drawing which forms a further art hereof, and to the accompanying descriptive matter, in which there are illustrated and described certain preferred embodiments of the invention.

BRIEF DESCRIPTION OF THE DRAWINGS

In the drawings.

FIG. 2 is a fragmentary showing of a portion of a first modified embodiment of my invention;

FIG. 3 is a sectional view taken along the line 3—3 of FIG. 2;

FIG. 4 is a fragmentary showing of a portion of a second modified embodiment of the invention.

FIG. 6 is a diagram illustrative of physical principles underlying the operation of my invention.

DESCRIPTION OF THE PREFERRED EMBODIMENTS

Figure 1:
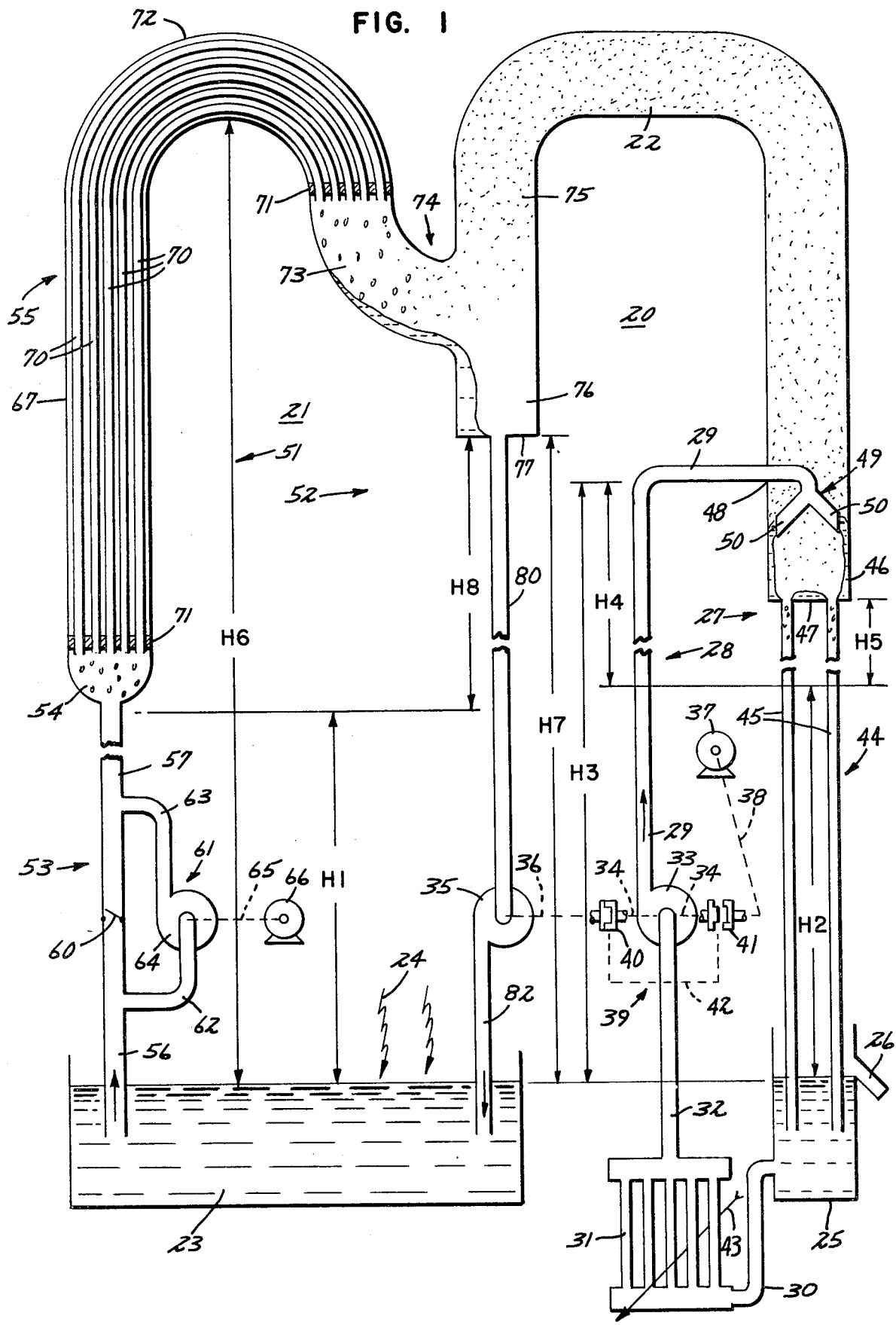
FIG. 1 is a schematic diagram of a structure showing one embodying my invention.

Turning first to FIG. 1, a water purification system according to my invention is shown to comprise output means 20 and input means 21 interconnected by a condensation chamber 22. The system operates to take raw water from a source 23, such as a "solar pond", maintained at a relatively high temperature by means such as solar radiation suggested at 24, and to deliver treated water to a container 25 having an overflow 26 from which the liquid output of the system is taken.

Output means 20 comprises a treated water supply column 27 and a treated water return column 28. The columns are both generally vertical, and are interconnected at their tops by a conduit 29 and at their bottoms by a conduit 30. Return column 28 comprises in sequence from conduit 30 a heat exchanger 31, a conduit 32, a pump 33, and conduit 29. Pump 33 has a shaft 34 which may be connected to or disconnected from either a water motor 35, having a driving shaft 36, or a source 37 of mechanical power such as an electric motor or a gasoline engine, having a driving shaft 38, by means of a clutching mechanism 39 which may comprise a pair of dog clutches 40, 41 having a common actuator 42. It is understood that the outside of heat exchanger 31 is bathed in cooling liquid, suggested at 43.

Supply column 27 comprises a source of potable water open to the atmosphere, such as container 25, conduit means 44 comprising a plurality of separate conduits 45, and a cooling chamber 46 from which conduits 45 extend downwardly to terminate within container 25. The surface of liquid in container 25 is to lie above the lower ends of conduits 45. Conduits 45 are essentially flush at their tops with the inner surface of the bottom 47 of chamber 46.

Conduit 29 penetrates the wall of chamber 46 at 48, and terminates therein in a distributor 49 including a plurality of nozzles 50 directed towards the walls of chamber 46, which walls are continuous upwardly with the wall of condensation chamber 22.

Turning to input means 21, there is shown a raw water supply column 51 and a raw water return column 52. Supply column 51 includes conduit means 53, a manifold 54, and an aspirator section 55. Conduit means 55 comprises lower and upper conduits 56 and 57 joined at a downwardly acting check or flapper valve 60: the lower end of conduit 56 is to extend below the surface of liquid in source 23. A bypass 61 around valve 60 includes lower and upper conduits 62 and 63 and a pump 64 having a shaft 65 arranged to be driven by a source 66 of mechanical energy.

Manifold 54 is a term used to refer to the connection between conduit 57 and aspirator section 55. The latter comprises a large outer tube 67 containing a plurality of aligned smaller inner tubes 70. As shown in the figure, the small tubes pass sealingly at their lower and upper ends through holes in rubber stoppers 71 or the like, but the same result may be accomplished by using so large a number of inner tubes 70 as to pack them rather tightly together in outer tube 67, so that the spaces between the inner tubes are comparable in area with the cross sections of the tubes themselves.

Aspirator section 55, including outer tube 67 and inner tubes 70, arches vertically at 72 to become the upper portion of raw water return column 52, which continues as the branch 73 of a Y-tube 74 having an open upper outlet 75 continuous with condensation chamber 22, and a lower separator portion 76 closed at 77, from which passes downwardly a conduit 80. Conduit 80 comprises the inlet to water motor 35, the outlet of which is a conduit 82 of which the lower end is to extend below the surface of liquid in source 23.

Except for the liquid surfaces in source 23 and container 25, the entire system just described is closed to the atmosphere.

The structure just described must not be thought of as of small size. In general terms, the height of manifold 54 above the surface at source 23 is about 30 feet, with the other vertical dimensions generally in proportion: the diameters of various tubes and conduits are shown to a larger scale, for clarity of illustration. The large vertical dimensions are determined by the physical principles underlying system operation, as will be discussed below in connection with FIG. 6.

Reference should first be had, however, to FIGS. 2 and 3, which show a second embodiment of the raw water supply column, identified by reference numeral 91, including conduit means 92 and a structure 93 performing the joint functions of manifold 54 and aspirator section 55 in FIG. 1.

Conduit means 92 comprises lower and upper conduits 94 and 95 joined at a downwardly acting check valve 96 and provided with a by-pass 97 as described in connection with by-pass 61 of FIG. 1. The lower portion of section 93 is made up of a plurality of units 100, 101 and 102 in vertical sequence, the total length of which is somewhat exaggerated in the figure: all units are enclosed in a housing 103, and each is capable of functioning as manifold 54 of FIG. 1.

Unit 101 comprises a central traverse partition 104 which sealingly passes a plurality of tubes 105 arranged circularly near the periphery of the partition (see FIG. 3) to project above and below the partition. Similar partitions 106 and 107 and tubes 110 and 111 are found in units 100 and 102, respectively. A second plurality of tubes 112 is grouped above and within the outline of tubes 105 and extends through an upper seal 113 in unit 101 and a lower seal 114 in unit 100, tubes 112 terminating below the upper ends of tubes 105 in unit 101 and above the lower ends of tubes 110 in unit 100. A further plurality of tubes 115 is grouped below and within the outline of tubes 105 and extends through a lower seal 116 in unit 101 and an upper seal 117 in unit 102, tubes 115 terminating above the lower ends of tubes 105 in unit 101 and below the upper ends of tubes 111 in unit 102. Conduit 95 passes through the bottom of unit 102 to open above the bottoms of tubes 111. Further tubes 120 have lower ends, which extend through an upper seal 121 in unit 100 to terminate below the upper ends of tubes 110. Tubes 120 pass within an outer tube 122, that is an extension of housing 103, to and through an upper partition 123 into a chamber 124 having a downwardly extending branch 125 corresponding to branch 73 of FIG. 1.

A further modification of the treated water return column is shown in FIG. 4. Here conduits 45' do not extend from chamber 46 into the water in container 25, but extend downwardly into a closed chamber 126 through the top 127 thereof. Chamber 126 is located above the barometric height of water in column 27 as defined below. A further conduit 128 extends upwardly into chamber 126 through the bottom 130 thereof, and downwardly into container 25 at 131: it is to terminate below the surface of liquid in container 25. The bottoms of conduits 45' in chamber 126 are below the top of conduit 128.

Figure 5:
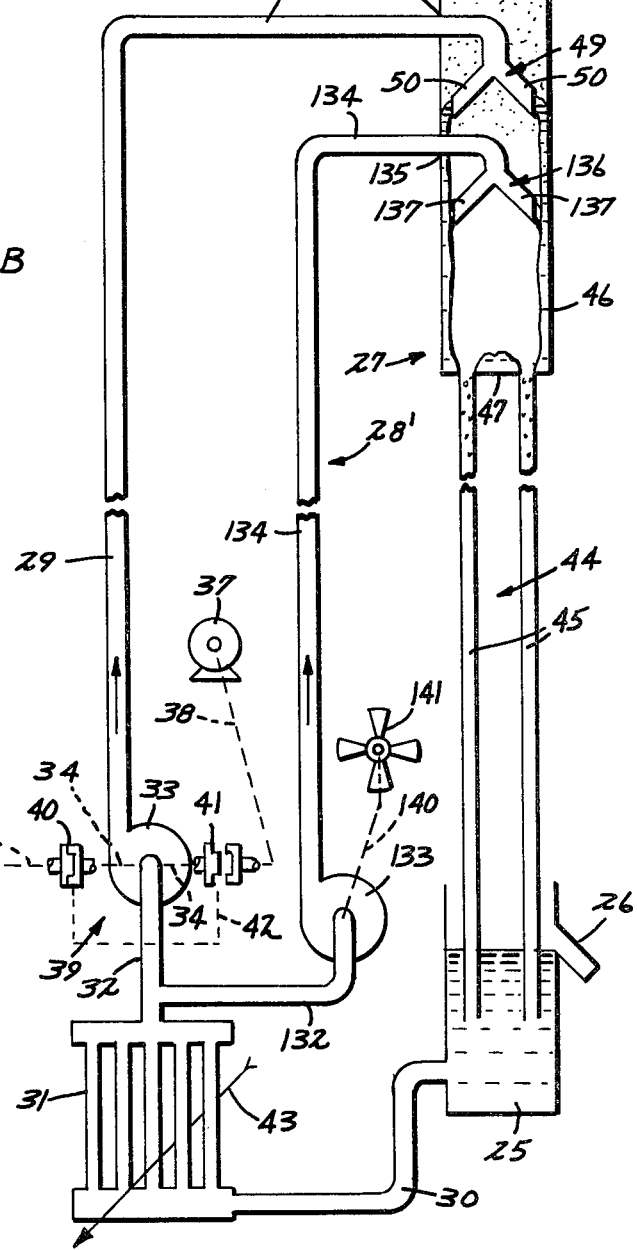
FIG. 5 is a fragmentary showing of a portion of a further embodiment of the invention.

A still further modification of output means 20 is shown in FIG. 5. In this figure treated water return column 28 of FIG. 1 is augmented to improve the usefulness of the system. In return column 28' conduit 32 has a branch 132 connected to the input of a second pump 133, the output of which is connected, by a conduit 134 passing through the wall of chamber 46 at 135, to a second distributor 136 having nozzles 137. The shaft 140 of pump 133 is driven by a second power source 141, in this case a wind vane or wind turbine.

OPERATION

Reference should now be had to FIG. 6, in which the axis of abscissas is in units of temperature from 0 to 100 degrees centigrade. Curve A plots, against temperature, the vapor pressure of water at that temperature, increasing from about 4 millimeters of mercury at 0° to 760 millimeters of mercury at 100° C. Curve B plots against temperature the "barometric height" of a column of water which is supported, in a vertical tube sealed at the top, by a standard atmosphere when the space above the liquid contains only water vapor, from 33.7 feet at 0° C. to 0 feet at 100° C. From these curves it will be seen that as temperature rises so does vapor pressure of water, while the height of the sealed column of water which a standard atmosphereic pressure supports becomes less as the temperature rises. The connection between these relationships and the operation of my invention will become evident in the following discussion, which will originally be directed to the embodiment of FIG. 1.

For purposes of illustration let it be assumed that source 23 comprises a solar pond, or other supply or raw water at a temperature of 55° C., and that an adequate supply of cooling water at a temperature of 25° C. is available at 43. While the operation of the system will in theory be slightly modified by the presence of dissolved gas such as air in the water at 23 and 25, such dissolved gas is continuously removed in the operation of the system, and its effect is found to be negligible in practice. Sea level operation under standard atmospheric conditions will also be assumed.

The first step in setting this system into operation, after establishing cooling at 43, is to fill container 25 with water, of an acceptable purity, to a level above the bottoms of conduits 45. Motor 37 is next energized and clutch mechanism 39 is operated to cause motor 37 to drive pump 33: at this time fluid motor 35 is not connected to shaft 34. Operation of pump 33 draws water from container 25 to be cooled at 31, raises it through a head $H_3$ and supplies it to distributor 49, so that initially water must be added to container 25 until heat exchanger 31 and both of columns 27 and 28 are full. For convenience in discussion, the surfaces of liquid in source 23 and container 25 are shown in FIG. 1 to be at the same level.

Water from nozzles 50 flows down the inner wall of chamber 46, cooling one end of condensation chamber 22 to a temperature 30° below that of source 23, and then flows out turbulently at the bottom 47 of chamber 46 through conduits 45.

Condensation chamber 22 initially contains gas, principally in the form of air and water vapor, and bubbles of the gas are entrained in the liquid in conduits 45, and are swept downward into container 25, from which the components of this gas which have not condensed are free to bubble upward to the atmosphere.

This removal of gas from chamber 22 by entrainment in the flowing liquid constitutes a vacuum pumping action which reduces the pressure in chamber 22. As the pressure decreases it becomes more and more difficult to entrain gas bubbles in the downflowing liquid. I have found that the process is greatly facilitated, and the required flow of liquid is materially decreased, by using a plurality of small conduits 45 rather than a single conduit of equal cross section, and I ascribe two reasons for this. The first is that it is easier for a liquid to entrain bubbles of gas in small tubes than in large ones, and the second is that once entrained, the downward transfer of the bubbles is more efficiently accomplished in small tubes.

Figure 7:
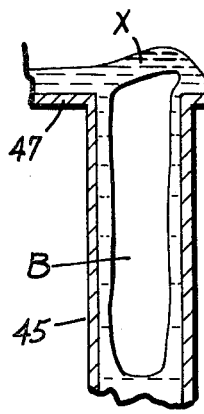
FIGS. 7-11 are fragmentary diagrammatic views illustrating the operation of the invention.
Figure 8:
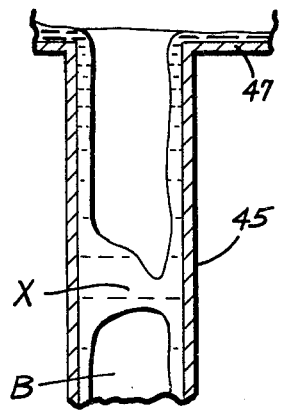

Observation of the operation of my equipment using transparent tubes, both of wetable and nonwetable materials, has shown that entrainment can occur either at the upper openings of conduits 45 or at a location somewhat below that level. In either case it results when a quantity of liquid is moved, whether by turbulence in the bottom 47 of chamber 46 (see FIG. 7) or by random variation in the flow in a tube (see FIG. 8), so that it closes the entire cross section of a tube, as at X in either Figure, to form the bubble B. For any selected flow rate this is statistically more probable when the tube is of smaller diameter. It is also clear that each bubble so formed in a small tube is of smaller volume, so that transfer of a required volume of gas in a given time interval requires a larger number of tubes as their size is reduced.

Figure 9:
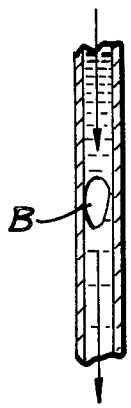
Figure 10:
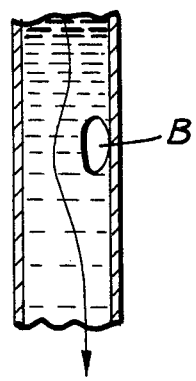

Another reason for using a plurality of small tubes is shown in FIGS. 9 and 10. Because of surface tension, bubbles of gas in a liquid tend to a generally spherical contour, and also tend to engage the tube wall. The volume contained in bubble B in each of these figures is the same, but in FIG. 9 the tube is of such diameter that the bubble substantially fills the tube transversely, and practically all the descending liquid is effective upon the bubble to counteract its natural upward movement. In FIG. 10 on the other hand, the tube is larger, so that much of the descending liquid flows past the bubble without appreciably impeding its rise: the fluid flow in larger tubes is thus less effective for the entrainment function.

The production of fluid flow by pump 33 is a major power demand in my apparatus, and it is desirable to keep this factor as small as possible. A minimum flow is of course required to keep a complete sheet of low temperature water flowing down the wall of chamber 46 at a suitable low level: by use of multiple small conduits 45 that minimum flow is also found sufficient to accomplish the pumping function during start-up of the system. After all the non-condensible gas is pumped from the system entrainment of bubbles ceases, except at a low rate to remove any air brought into the system in solution in the water from either source 23 or container 25.

The vacuum pumping action just described continues until substantially all the air has been exhausted not only from chamber 22 but also from columns 51 and 52, so that the spaces above the liquid in columns 27, 51, and 52 contain only water vapor. Atmospheric pressure is effective at the bottoms of all four of columns 27, 28, 51 and 52. In columns 51 and 52 the water is raised, through valve 60 and motor 35 respectively, to a level $H_1$ of about 28.6 feet above the surface in source 23, and the vapor pressure above the liquid in both columns is about 118 millimeters of mercury, these quantities corresponding to the water temperature of 55° C., and being identified respectively by point $P_1$ on curve B, and point $P_2$ on curve A, of FIG. 6.

In column 27 the water rises through conduits 45 to a level $H_2$ of about 32.85 feet above the surface in container 25, and the vapor pressure above the liquid is about 24 millimeters of mercury, these quantities corresponding to the water temperature of 25° C. and being identified respectively by point $P_3$ on curve B, and point $P_4$ on curve A, in FIG. 6. It will be evident that in column 28 the head against which pump 33 must operate is reduced from $H_3$ to $H_4$.

The bottom 47 of chamber 46 is several feet above the barometric height $H_2$ of water in column 27. The resulting pressure head $H_5$ cause continuous downflow of liquid in conduits 45, carrying the entrained bubbles to the bottoms of the conduits.

The size of conduits 29, 30, the number and sizes of conduits 45 and the capacity of pump 33 must be sufficient to maintain a downward flow rate in conduits 45 greater than the rate at which bubbles can rise in these conduits, and sufficient to maintain continuous entrainment of gas bubbles. Chamber 46 must not, however, be allowed to fill to such a level that the tops of conduits 45 are continuously under water, for this would terminate the vacuum pumping action even though the flow of liquid were maintained by pump 33.

Now motor 66 is energized to drive pump 64, closing valve 60 and raising raw water at 55° C. in column 51 above its barometric height $H_1$ to a height $H_6$ at which it flows over the top of column 51 into column 52 and returns by gravity to source 23 through water motor 35. The motor is initially unloaded and offers little restriction as it idles. However, clutch mechanism 39 is now operated to disconnect pump 33 from power source 37 and to connect the pump instead as a load on motor 35.

The rate of operation of pump 64 is such as to maintain a head $H_7$ of liquid near the top of conduit 80, which is above the barometric level $H_1$ by an amount $H_8$. The apparatus is so constructed that $H_8$ is greater than $H_4$, so that the descent of water in conduit 80 supplies more than enough energy to lift water in conduit 29. Power source 37 may now be deenergized.

A difference in vapor pressure of 118 minus 24, or 94, millimeters of mercury now exists between the left and right ends of chamber 22, and migration of water in the vapor phase through the chamber begins. This migration continues because water vapor continuously condenses on the film of cold water in chamber 46, and raw water continuously vaporizes in Y-tube 74, so that equilibrium in chamber 22 cannot be established. The condensed water is of course free from non-volatile pollutants, and is carried by gravity into container 25.

Figure 11:
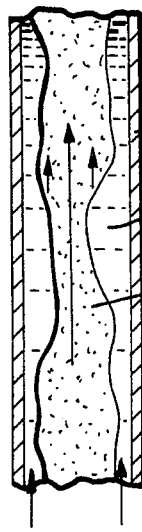

The number and size of the tubes 70 is such that vaporization at their upper ends, under the low pressure in chamber 22 and the warm temperature of the water, increases to a volumetric rate greater than the output of pump 64. The vaporization in fact is a quite violent boiling action, and the level of that action moves downward through tubes 70 until it reaches manifold 54 at a height $H_1$. The tubes are all coated internally with water, however, and water from manifold 54 is continuously splashed by the boiling into the adjacent ends of the tubes. This water is swept upward through the tubes and out into Y-tube 74 by the current of water vapor moving toward the low pressure in the condensation chamber, as suggested in FIG. 11, in which the liquid is shown at L to move slowly up a tube 70 by the more rapidly moving current of vapor V. I refer to this action as aspiration.

Experience has shown that when system operation become stable, the amount of raw water passing through tubes 70 in the liquid and vapor phase is greater than that originally supplied by pump 64. This is made evident when valve 60 opens, as observed visually when conduits 56, 57 are transparent, or as detected by a suitable flow meter located just above the valve when the conduits are opaque. When this occurs, power source 66 may also be deenergized.

The apparatus will now continue to operate, without the use of either source 37 or source 66, as long as the temperature of the raw water 23 is greater than that of the cooling water at 43 by a sufficient amount. It is this temperature difference that supplies the energy for raising liquid against gravity, by aspiration in column 51 and by water motor 35 in column 28. If by reason of clouds obscuring the sun for example, the temperature of the water in source 23 drops, the vaporization rate at manifold 54 similarly drops, and ultimately not enough liquid water will be transported to conduit 80 to maintain head $H_8$ greater than head $H_4$. Water motor 35 can no longer drive pump 33, and operation of the system ceases. A rise in the temperature of the cooling bath at 43 will of course have the same result.

It is apparent that in its normal operating condition, the system requires no external energy for either pump 33 or pump 64, and that energy for the entire system is derived from a thermal source, the difference in temperature between the raw water and the cooled heat exchanger output. Of course, if pumping is required to supply cooling at 43, energy for this use must be provided. At the same time, migration of water vapor through the condensation chamber 22 results in continual addition of treated water to container 25.

It is to be understood that if the raw water should contain contaminants having a vapor pressure near or higher than that of water, these contaminants would vaporize, migrate, condense, and reach container 25 just as the water does. The system is intended to remove non-volatile contaminants, however, not the volatile contaminants less frequently encountered.

It will also be appreciated that the water returning from conduit 80 not only is cooler than that of source 23, heat being lost by the evaporation, but also contains a higher percentage of impurities, since all such impurities return to source 23 while water itself is partially removed by evaporation. Source 23 must therefore be of sufficient volume and temperature that continued operation of this system does not unduly cool it or increase its concentration, to cause deposition of solids within the system components for example. A small flushing flow of raw water into and out of source 23 is desirable.

There are certain requirements of a system according to my invention to operate successfully. Most important, there must be a supply of raw water at a sufficiently high temperature, and a supply of cooling water at a sufficiently low temperature. Additionally, a sufficient flow of water must pass through distributor 49 to enable initial downward entrainment of bubbles of gas, which means a continuous head $H_8$ of liquid in conduit 80, above the barometric level, sufficient to operate motor 35 to drive pump 33 at this output level. This in its turn means a sufficient rate of turbulent vaporization at manifold 54 to splash more than that quantity of water into tubes 70 and lift it therethrough by aspiration.

Consideration of the information displayed in FIG. 6 will make it evident that when the structure is erected, the height of manifold 54 is determined by the expected temperature of the source 23. If the temperature of this source varies very much, the effectiveness of the structure may be seriously affected. A change for example of only two degrees in the raw water temperature is accompanied by a change of over a foot in the barometric height in column 51. If the temperature change is a decrease, the barometric level can rise above the level of the bottoms of tubes 70, while if the temperature increases the level can drop well down into conduit 57. In neither of these areas is the vaporization as effective as that first described, and the output of the system suffers greatly. The modification of the invention shown in FIG. 2 is provided to meet this difficulty.

In this arrangement the supply of water in column 91 results from a somewhat different aspiration action. Pump 97 is set into action as described in connection with FIG. 1, forcing raw water upwards through conduit 95 and tubes 111, 115, 105, 112, 110 and 120, and trapping air under slightly different pressure heads beneath partition 107, seal 117, partition 104, seal 113, partition 106, and seal 121. As before, vaporization into the condensation chamber takes volumetrically faster than the pump can supply liquid, and the level at which vaporization takes place moves down column 91 to a barometric height determined by the temperature of the raw water. The flow produced by the pump brings the tubes in question to the temperature of the raw water source. The apparatus is preferably so constructed that for a maximum expected temperture of raw water the level will be within unit 102, while for the minimum expected temperature the level will be within unit 100: more than three of these units may be provided to accommodate a greater range of temperature if desired. Note that as the level of the vaporization descends, a layer of trapped liquid remains standing on the upper faces of members 106, 114, 104, 116 and 107, and possibly on the bottom on unit 102 as well, and is in vigorous vaporization as described in connection with FIG. 1, so that for raw water at the maximum estimated temperature there will be six loci rather than one at which liquid may be splashed or entrained upwardly, that is at the bottoms of tubes 111, 115, 105, 112, 110 and 120. If the initial raw water temperature decreases, one or more of units 102, 101 and 100 may fill with water sufficiently to create an unbroken upward liquid path, but entrainment can still take place at all the loci above the barometric height.

It should also be mentioned that because of the vaporization of water in each of units 102, 101 and 100 the temperature of the water decreases as does the vapor pressure above the standing liquid. For example, raw water at 55° C. (vapor pressure 118 mm of mercury) may enter conduit 95: the temperature of the liquid in units 102, 101 and 100 may be 50° C., 45° C. and 40° C. with corresponding vapor pressures 92.5, 71.9 and 55.3 mm of mercury, all respectively, so that the water emerging from tubes 122 may be at 35° C. with a vapor pressure of 42.2 mm of mercury—still functionally more than the vapor pressure at the other end of condensation chamber 22. Accordingly, the apparatus is much less prone to decreased efficiency with variation in the raw water temperature.

Stability of operation is enhanced if additional units like 100, 101, or 102 are placed in column 91, even above the highest barometric level expected. These additional units insure an even distribution of water flow in the tubes 120.

Another factor of serious consequence lies in the chosen diameters of tubes 70 (or 120) and conduits 45. As to the former, there is a limit to the rate at which water at 55° C. for example will evaporate into an atmosphere saturated with water vapor, and yet it is this flow of water vapor through tubes 70 which must mechanically aspirate into column 52 roughly the same volume of water per unit time as that circulated by pump 33. Referring again to FIG. 11, only a small portion of the vapor V flowing in a tube 70 is close enough to the wall of the tube to aspirate liquid L lying on the tube's walls. By using many small tubes instead of a single large tube, more of the moving vapor is enabled to accomplish movement of a liquid.

FIG. 4 shows a modification of treated water supply column 27. As a practical matter a single conduit of sufficient diameter to conduit the required flow, although unsatisfactory for reasons given above, is less complicated and expensive than an assemblage of smaller tubes, especially when the length of the structure is as great as is here required. Chamber 126 of this figure functions to connect a number of smaller conduits 45' of short length to a single larger conduit 128, so as to obtain the advantages of both structures. Its operation is as follows.

During the initiation of system operation pump 33 causes flow of water into chamber 46 and thence down through conduits 45' into chamber 126, entraining bubbles of gas as previously explained.

TABLE 1

| HEAD | $H_1$ | | 27 ft. | |
|---|---|---|---|---|
| HEAD | $H_2$ | | 33 ft. | |
| HEAD | $H_3$ | | 42 ft. | |
| HEAD | $H_4$ | | 9 ft. | $(=H_3 - H_2)$ |
| HEAD | $H_5$ | | 8 ft. | |
| HEAD | $H_6$ | | 47 ft. | |
| HEAD | $H_7$ | | 46 ft. | |
| HEAD | $H_8$ | | 19 ft. | $(=H_7 - H_1)$ |
| HEAD | $H_9$ | | 4 ft. | |
| Source | 23 | 55° C. | | |
| Coolant | 43 | 25° C. | | |
| Motor | 37 | 30 watts | 120 rpm | |
| Motor | 66 | 30 watts | 120 rpm | |
| Pump | 33 | 1000 ml/min. | | |
| Pump | 61 | 1000 ml/min. | | |
| Pump | 133 | 1000 ml/min. | | |
| Chamber | 22 | 2" diameter | | |
| Chamber | 130 | 2" diameter | 8" ht. | 37 ft. elev. |

TABLE 1-continued

| Conduit | 29,30 | .5" diameter | |
|---|---|---|---|
| Conduit | 56,57 | .5" diameter | |
| Conduit | 80,82 | .5" diameter | |
| Conduit | 128 | .375" diameter | |
| Conduit | 132,134 | .5" diameter | |
| Tubes | 45 | 6 mm diam. | 6 in number |
| Tubes | 70 | 6 mm diam. | 15 in number |
| Tubes | 105 | 10 mm diam. | 6 in number |
| Tubes | 110 | 10 mm diam. | 6 in number |
| Tubes | 111 | 10 mm diam. | 6 in number |
| Tubes | 112 | 10 mm diam. | 7 in number |
| Tubes | 115 | 10 mm diam. | 7 in number |
| Tubes | 120 | 10 mm diam. | 7 in number |

Chamber 126 fills to the level of the top of conduit 128, air being forced downward and out that conduit to bubble up out of container 25. When the liquid in chamber 126 rises above the level of the bottoms of conduits 45', entrained gas bubbles up to the top of chamber 126 and hence, down conduit 128. At the time when the head of water reaches the top of conduit 128, the pressure in the chamber above the liquid is greater than that in chamber 46 by the difference in head $H_9$, which may be a matter of several feet. All the liquid flowing down conduits 45' must flow through the single conduit 128, so that the volumetric flow in 128 is much greater than that in any one tube 45'. With the less negative air pressure, the greater volume of accumulated air, and the large liquid flow it becomes possible for the single conduit 128 to satisfactorily conduct downwardly both the air and the water leaving chamber 46. After all the non-condensible gas has been pumped from the system entrainment of bubbles ceases, except at a low rate to remove any air brought into the system in solution in the water from either source 23 or container 25.

The operation of FIG. 5 is generally the same as that given for FIG. 1, but has peculiar advantages under some conditions of installation. It has been previously been pointed out that if the temperaure of source 23 drops too low, operation of the system ceases, because pump 33 is not driven to provide a cooling film on the wall of chamber 46. The structure of FIG. 5 makes possible night operation of the system, at locations where there is a night breeze, even if at such a reduced rate that water motor 35 cannot drive pump 33. Here energy for the operation of auxiliary pump 133 is obtained from wind vane 141, to continue the flow of cooling water over the wall of chamber 46, so that to the extent that any vapor migration occurs in chamber 22, the resulting condensed water is added to that in container 25. It is only when both wind and insolation fail that this modified system ceases to function.

Ordinarily, strong insolation and the presence of wind do not occur at the same time, so there is little likelihood that so small a pump as 133 will result in too great liquid flow in chamber 46.

In operative embodiments of the invention the data shown in Table 1 have been accumulated, and are given for illustrative purposes only.

From the foregoing it will be clear that I have invented an arrangement for obtaining potable water from water which is not fit for drinking, the arrangement using no external energy after being initially set in operation, so long as supplies of warmer and cooler water are available at a sufficient temperature differential. Modifications of the basic system are shown which improve its operation when the temperature of the warm water varies over a range, which decrease the cost and increase the sturdiness of the system, and which extend its use to locations where a decrease in warm water temperature is nevertheless accompanied by the rise of a wind. Finally, it is pointed out that the system is adaptable for use in chemical engineering applications other than that of water purification, for example, in deriving ethyl alcohol from the liquid known as brewer's mash.

Numerous characteristics and advantages of my invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

What is claimed is:

1. A liquid treating system which, after an initial start-up period, is maintained operable solely by the temperature difference between cooler, treated liquid and warmer, untreated liquid comprising, in combination:

a condensation chamber closed to the atmosphere and having first and second portions in communication with each other to provide a path between said portions for vapor but not for liquid, said condensation chamber having its second portion disposed at a given height;

closed output means connected to said first portion of said chamber and including an apogee and pumping means actuable to cause flow of treated liquid at a first temperature to said apogee and into said first portion, so as to cool said first portion, and from said first portion, so as to lower the pressure therein by entrainment of gas therefrom to the vapor pressure of the liquid at said first temperature;

a source of untreated liquid under atmospheric pressure and at a second, higher temperature, said source disposed at a height lower than said height at which said second portion of said condensation chamber is disposed;

closed input means connected to said source and to said second portion of said chamber, for enabling flow of untreated liquid and vapor thereof, at a second, higher temperature, to a height above said apogee of said output means and into said second portion, and for enabling gravity drain of unvaporized, untreated liquid from said second portion to the level of said source, to maintain the pressure in said second portion at the vapor pressure of said liquid corresponding to said second temperature, whereby migration of vapor from said second portion to said first portion lowers the pressure in said second portion to the vapor pressure of said liquid at said second temperature, at which pressure said flow in said input means is caused by said atmospheric pressure on said source;

and means driven by said gravity drain for actuating said pumping means.

2. A structure according to claim 1 in which said output means includes a chamber closed to the atmosphere, a plurality of tubes having upper inlets opening into the bottom of said first condenser portion and lower outlets projecting downward into said chamber, a receiver for treated liquid, and conduit means projecting upwardly into said chamber, to a level above the bottoms of said plurality of tubes, and projecting downwardly into said receiver to extend beneath said surface of said treated liquid.

3. A structure according to claim 1 in which the temperature of the untreated liquid is higher than that of the treated liquid.

4. A water desalination system which, after an initial start-up period, is maintained operable solely by the temperature difference between cooler, treated water and warmer, raw water comprising, in combination:

a condensation chamber closed to the atmosphere and having first and second portions in communication with each other to provide a path between said portions for water vapor but not for liquid water, said condensation chamber having its second portion disposed at a giving height;

closed output means connected to said first portion of said chamber and including an apogee and pumping means actuable to cause flow of treated water at a first temperature to said apogee and into said first portion, so as to cool said first portion, and from said first portion, so as to lower the pressure therein by entrainment of gas therefrom to the vapor pressure of water at said first temperature;

a source of raw water under atmospheric pressure and at a second, higher temperature, said source disposed at a height lower than said height at which said second portion of said condensation chamber is disposed;

closed input means connected to said source and to said second portion of said chamber, for enabling flow of raw water and water vapor, at a second, higher temperature, to a height above said apogee of said output means and into said second portion, and for enabling gravity drain of unvaporized raw water from said second portion to the level of said source, to maintain the pressure in said second portion at the vapor pressure of water corresponding to said second temperature, whereby migration of water vapor for said second portion to said first portion lowers the pressure in said second portion to the vapor pressure of water at said second temperature, at which pressure said flow in said input means is caused by said atmospheric pressure on said source; and means driven by said gravity drain for actuating said pumping means.

5. A structure according to claim 4 in which said outlet means includes further pumping means, to cause said flow of treated water, and wind-actuated means connected to actuate said further pumping means.

6. A structure according to claim 4 wherein said input means includes input means energizable to impell raw water into said second portion of said condensation chamber.

7. A water desalination system which, after an initial start-up period, is maintained operable solely from the temperature difference between cooler, treated water and warmer, raw water, comprising, in combination:

a closed condensation chamber having first and second portions and providing a path between said portions for water vapor but not for liquid water, said condensation chamber having its second portion disposed at a given height;

closed input means connected to said chamber for supplying raw water and water vapor from a source disposed at a height lower than said height at which said second portion of said condensation chamber is disposed to said second portion by aspiration, and discharging said raw water from said second portion by gravity; and closed output means having an upper extremity disposed at a height lower than said height at which said second portion of said condensation chamber is disposed, said output means being filled with desalinated water and connected to said chamber for condensing water vapor in said first portion and extracting gas from said first portion by downward entrainment of the gas by gravity flow of the desalinated water from said upper extremity of said output means, said output means comprising pumping means, actuated by the discharging raw water in said input means, for supplying water entrainment.

8. A water desalinization system which, after an initial start-up period, is maintained operable solely from the temperature difference between cooler, treated water and warmer, raw water, comprising, in combination:

a closed condensation chamber having first and second portions and providing a path between said portions for water vapor but not for liquid water;

closed input means connected to said chamber for supplying raw water and water vapor from a source disposed at a height lower than said height at which said second protion of said condensation chamber is disposed to said second portion by aspiration, and discharging said raw water from said second portion by gravity;

closed output means having an upper extremity disposed at a height lower than the height at which said second portion of said condensation chamber is disposed and connected to said chamber for condensing water vapor in said first portion and extracting gas from said first portion by downward entrainment, said output means comprising a closed chamber below said first portion, a first plurality of downward conduits for turbulently receiving liquid from said first portion, and terminating within said closed chamber, a receiver of treated water below said chamber, and a lesser plurality of conduits each terminating at one end in said receiver below the level of said treated water and at the other end in said chamber above the termination of the conduits of said first plurality;

and means supplying water from said receiver to said first portion for entrainment of said gas.

* * * * *